(12) United States Patent
Kolax et al.

(10) Patent No.: US 8,784,592 B2
(45) Date of Patent: Jul. 22, 2014

(54) METHOD FOR MANUFACTURING A CORE COMPOSITE PROVIDED WITH COVER LAYERS ON BOTH SIDES

(75) Inventors: Michael Kolax, Hamburg (DE); Wolf-Dietrich Dolzinski, Ganderkeese (DE)

(73) Assignee: Airbus Operations GmbH, Hamburg (DE)

( * ) Notice: Subject to any disclaimer, the term of this patent is extended or adjusted under 35 U.S.C. 154(b) by 661 days.

(21) Appl. No.: 12/736,301

(22) PCT Filed: Feb. 20, 2009

(86) PCT No.: PCT/EP2009/052031
§ 371 (c)(1),
(2), (4) Date: Sep. 28, 2010

(87) PCT Pub. No.: WO2009/127460
PCT Pub. Date: Oct. 22, 2009

(65) Prior Publication Data
US 2011/0011521 A1    Jan. 20, 2011

Related U.S. Application Data

(60) Provisional application No. 61/044,913, filed on Apr. 15, 2008.

(30) Foreign Application Priority Data

Apr. 15, 2008   (DE) .......................... 10 2008 019 070

(51) Int. Cl.
| | | |
|---|---|---|
| *B29C 65/00* | (2006.01) | |
| *B32B 37/00* | (2006.01) | |
| *B29C 63/10* | (2006.01) | |
| *B65H 81/00* | (2006.01) | |
| *B31C 3/00* | (2006.01) | |
| *B31F 1/20* | (2006.01) | |
| *B29D 22/00* | (2006.01) | |
| *B65C 3/16* | (2006.01) | |
| *A61F 13/15* | (2006.01) | |
| *B32B 3/12* | (2006.01) | |

(52) U.S. Cl.
USPC ............. 156/155; 156/87; 156/187; 156/190; 156/210; 156/213; 156/215; 156/227; 156/292; 428/116; 428/117

(58) Field of Classification Search
USPC ........... 156/600, 87, 155, 156, 184, 185, 186, 156/187, 188, 189, 190, 191, 196, 210, 212, 156/213, 215, 217, 218, 227, 242, 245, 247, 156/292; 428/116, 117, 118
See application file for complete search history.

(56) References Cited

U.S. PATENT DOCUMENTS

| | | | | |
|---|---|---|---|---|
| 2,454,719 | A * | 11/1948 | Scogland ...................... | 156/155 |
| 3,641,230 | A * | 2/1972 | Jenks ........................... | 264/152 |
| 4,594,120 | A * | 6/1986 | Bourland et al. ............. | 156/155 |
| 4,946,526 | A * | 8/1990 | Petty-Galis et al. .......... | 156/155 |
| 5,372,868 | A * | 12/1994 | Prewo et al. .................. | 428/167 |
| 2004/0055248 | A1 * | 3/2004 | Grillos ......................... | 52/783.1 |
| 2007/0054087 | A1 * | 3/2007 | Smith et al. .................. | 428/116 |

FOREIGN PATENT DOCUMENTS

| | | |
|---|---|---|
| DE | 843 890 | 7/1949 |
| DE | 101 46 021 A1 | 10/2003 |
| DE | 10 2004 013 145 | 10/2005 |
| DE | 10 2005 016 654 | 10/2006 |
| DE | 10 2006 056 353 | 12/2007 |
| DE | 10 2006 050 823 | 5/2008 |
| DE | 10 2008 019 070 | 11/2009 |
| EP | 0390536 | 10/1990 |
| JP | 06-134319 | 5/1994 |
| JP | 11-99993 | 4/1999 |
| JP | 2008-68487 | 3/2008 |
| WO | WO 03/103933 | 12/2003 |
| WO | WO 2009/127460 | 10/2009 |

OTHER PUBLICATIONS

English translation of the International Preliminary Report on Patentability and Written Opinion in corresponding PCT Application PCT/EP2009/052031 mailed Nov. 18, 2010.

International Search Report for PCT/EP2009/052031, mailed Jun. 8, 2009.
"Technologie du Preimpregne", Dec. 1995, CIBA, XP002527371.
German Search Report for 10 2008 019 070.5, mailed Oct. 15, 2008.
German Office Action for Application No. 10 2008 019 070.5 dated Oct. 8, 2008.
European Office Action for Application No. 09 731 704.4—2307 dated Feb. 13, 2012.
Chinese Search Report for Application No. CN 200980113107.4 dated Oct. 24, 2012.
Japanese Office Action for Patent Application No. JP 2011-504390 dated Oct. 30, 2012.
Chinese Office Action for Patent Application No. CN 200980113107.4 dated Jun. 20, 2013.
Chinese Office Action for Patent Application No. 200980113107.4 dated Nov. 5, 2012.

* cited by examiner

*Primary Examiner* — Philip Tucker
*Assistant Examiner* — Brian R Slawski
(74) *Attorney, Agent, or Firm* — Jenkins, Wilson, Taylor & Hunt, P.A.

(57) ABSTRACT

The invention relates to a method for manufacturing flat, single or double curved core composites 1, 23 with at least one folded honeycomb core 4, 19. Prior to applying the initially not yet hardened cover layers 2, 3, 13, 22 a curable and later removable core filler material 15, 16 is introduced into full-length drainage-enabling channels 5, 6 of the folded honeycomb core 4, 19 in order to prevent telegraphing of the cover layers 2, 3, 13, 22 into the channels 5, 6 of the folded honeycomb core when arranging and/or hardening the cover layers 2, 3, 13, 22 and to produce edge-free and polygon-free surfaces of the core composite 1, 23. The core composites 1, 23 made according to the method have optimum structural mechanical properties, an ideal surface quality from the aerodynamic and aesthetic point of view, whereby a direct reprocessing of the core composites 1, 23 is possible without the need for further time and cost-intensive as well as in some circumstances weight-increasing finishing steps. With the method it is possible to manufacture in particular one-piece fuselage sections with wound core composites 1, 23 with a folded honeycomb 4, 19 as well as shell segments with laid cover layers 2, 3, 13, 22 for longitudinally divided (segmented) fuselage sections for large aircraft.

8 Claims, 2 Drawing Sheets

Figure 1:
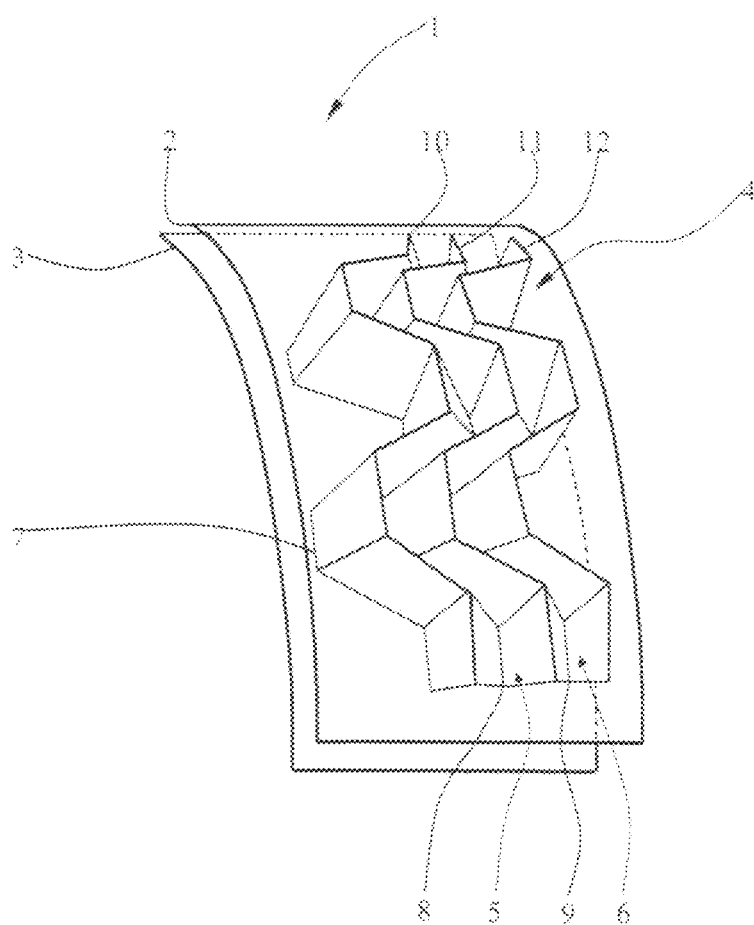

METHOD FOR MANUFACTURING A CORE COMPOSITE PROVIDED WITH COVER LAYERS ON BOTH SIDES

This application is the U.S. national phase of International Application No. PCT/EP2009/052031, filed 20 Feb. 2009 which designated the US and claims priority to German Application No. 102008019070.5, filed 15 Apr. 2008, and this application claims priority from U.S. Provisional Application No. 61/044,913 filed 15 Apr. 2008; the entire contents of each of the above applications are hereby incorporated by reference.

The invention relates to a method for manufacturing a core composite having a folded honeycomb core provided with cover layers on both sides, wherein the folded honeycomb core has drainage-enabling channels running parallel to the cover layers.

In aircraft construction carbon fibre plastics sandwich fuselage cells are made individually in the winding process. The core composites used for this are formed with honeycomb-shaped cores with small-volume cells in order to prevent the applied cover layers from denting in the area of the honeycombs and thus the in particular structural aerodynamic and optical deficiencies which result as a condition thereof.

Small-celled honeycomb cores of this kind are not suitable for winding one-piece fuselage sections for modern large passenger aircraft. On the one hand the honeycomb cores used lack drainage ability. Condensation penetrating into the core composite and/or forming inside the core composite can thereby lead to considerable damage, for example by the freezing processes at the high flying levels, which can significantly impair the structural strength in routine flying operations and thus represent an unacceptable safety risk. On the other hand the small-volume cell structures of the honeycomb cores considerably increase the weight. Furthermore with honeycomb cores, in relation to loads engaging parallel to the cover layers, only highly anisotropic properties can be set so that a configuration suitable for the load flow of the core composites formed conventionally with honeycomb cores is possible even if mainly only within very narrow limits.

Drainage-enabling folded honeycomb cores with full-length channels can provide a remedy here. The channels ensure a rapid reliable discharge of water. Furthermore the by way of example trapezoidal or zigzag-shaped path of the channels allows a configuration of the folded honeycomb cores which is improved as regards the load flow compared with the honeycomb cores. Furthermore such folded honeycomb cores can be configured with single or double curves so that it is possible to manufacture basically complete fuselage sections or at least shell segments for assembling fuselage sections with the formation of several longitudinal seams.

Folded honeycomb cores of this kind can however only be poorly wound and/or covered with cover layers since hereby no surfaces are formed which are continuously curved at least in some sections but a surface geometry arises which has a number of multi-fractional polygonal traits. Core composites having such a non-continuous surface geometry cannot however be used for the outer skin of a fuselage section of an aircraft for many reasons. For surfaces with edges impair in particular the aerodynamic properties of the component part made with this core compound and moreover lead in comparison with smooth structures to a considerably reduced mechanical structural bearing strength.

From the previously published DE 10 2006 050 823 A1 a composite part is known which is made by applying at least one fibre layer to a support structure, introducing a filler material into at least one hollow cavity of the support structure, injecting a matrix material into the fibre layer, hardening the fibre-reinforced layer and removing the filler material from the at least one hollow cavity.

From DE 10 2005 016 654 A1 a sandwich element is known for the sound-absorbing inner lining having a three-dimensionally formed core structure between two cover layers wherein the core structure and/or the cover layer has in at least some areas passages for sound transmission wherein a sound absorption layer is arranged in at least some areas in the region of at least one cover layer.

From DE 10 2006 056 353 B3 a method is known for manufacturing a folded honeycomb structure for a core composite which has the steps: preparing a flat material which has a softening temperature, locally heating the flat material in the area of predetermined fold lines to at least the softening temperature and folding the flat material along the heated area of the fold lines into the folded honeycomb structure.

From DE 843 890 B a plate-type hollow body is known having several longitudinal walls and transverse webs of laminated fibre material containing heat setting resin wherein each transverse web belongs to at least one of several bodies having channels or hollow cavities which are made from folded or wound fibre material and to which the longitudinal walls are joined by means of heat-setting resin, and during the manufacture the laminated longitudinal walls and transverse webs have been subjected during the heat action to a pressure in their thickness directions so that one compacted rigid and homogeneous complete unit is formed.

The object of the invention is therefore to provide a method for manufacturing a core composite which does not have the drawbacks outlined above.

This is achieved by a method according to claim 1. Preferred embodiments of the method form the subject of the dependent claims.

The method according to the invention has the following steps:

a) arranging a lower cover layer which is formed with a wet prepreg material on a tool, b) introducing a core filler material into the folded honeycomb core in at least some areas, c) arranging the prepreg material on the folded honeycomb core to produce an upper cover layer e) hardening the entire core composite by applying pressure and/or temperature, and f) removing the core filler material.

In the method step a) a "wet", that is a pre-impregnated reinforcement fibre arrangement saturated with a curable plastics material, a so-called "prepreg" material, is arranged or laid or wound on a tool to form a lower cover layer of the future core composite in dependence on the tool geometry. The shape of the future core composite is hereby predetermined by the surface geometry of the tool. The sequence of the steps a) and b) can also be exchanged where necessary. As prepreg material can be used by way of example a carbon fibre woven material, a carbon fibre knitted material or a carbon fibre non-crimp material infiltrated with a curable epoxy resin and which can have a strip or panel-shaped geometric shape.

Following this or preceding this in step b) a core filler material is introduced at least in some areas into the folded honeycomb core. It is hereby reached that the prepreg material applied on one or both sides of the folded honeycomb core to produce the cover layers is not drawn into the large-volume full-length channels (cavities) of the folded honeycomb core with the formation of troughs (so called "telegraphing") so that the subsequent core composite has from the aerodynamic, static and optical point of view ideal, that is in particular smooth, continuously curved (polygon-free) surfaces.

In method step c) the at least one folded honeycomb core is placed on the lower cover layer which is already laid on the tool. The folded honeycomb core has unlike conventional honeycomb cores no closed-cell repeat units, but continuous full-length channels. These full-length channels can have by way of example a zigzagged, curved or trapezoidal path and provide the drainage capacity for the core. Through skilled folding of initially laminar blanks the folded honeycomb core can have a single or double curvature so that the folded honeycomb core can be adapted in ideal manner to a predetermined surface geometry of an aircraft fuselage cell. The folded honeycomb core can be made with any reinforcement fibre arrangement or papers which are impregnated (saturated, infiltrated) with a thermosetting (curable) plastics material which is already completely hardened at the time of its use according to the method, in order to ensure the necessary inherent rigidity during processing. The folded honeycomb core for carrying out the present method can be formed by way of example with the known Nomex® paper or another carbon fibre woven material, carbon fibre non-crimp material or glass fibre woven material infiltrated with a suitable epoxy resin, phenol resin or polyester resin. The folded honeycomb core can alternatively also be formed with metal foils.

Furthermore it is possible to place the folded honeycomb core on the lower cover layer initially free of any core filler material and then to introduce the core filler material at least one some areas into the still accessible top side of the folded honeycomb core. In the case where a rotating winding mandrel ("male" tool) is used as the tool the core filler material can be applied and smoothed by means of a spatula with integrated dosing device for the filler material drawn up to the rotating folded honeycomb core. Once the core filler material has hardened method step d) proceeds.

In method step d) further prepreg material is arranged on the folded honeycomb core to produce an upper cover layer of the core composite. The prepreg material can be processed in the manner of narrow bands or as a wide panel-type semi-finished product. Where a rotating winding mandrel is used as the tool the then preferably band-type prepreg material can be wounded in layers onto the rotating folded honeycomb core. As a result of the core filler material a polygon-free arrangement of at least the upper cover layer is ensured.

In method step e) the entire core composite is subsequently hardened by using known hardening procedures by applying pressure and/or temperature.

In the last method step f) the core mould is completely removed from the folded honeycomb core in order to reduce the weight of the finished core composite and to create again the drainage capacity. If by way of example the material "Aqua-Core®" is used as the core filler material then the hardened core filler material can simply be washed out completely from the drainage-enabling folded honeycomb core by using water as the solvent. Basically wax melting at a suitable temperature and/or metal alloys can also be used as core filler material.

According to an advantageous development of the method the lower and/or the upper cover layers are stuck at least in some areas to the folded honeycomb core by an adhesive.

This hereby prevents the cover layers from dissolving from the folded honeycomb core and increases the damage tolerance as well as load bearing capacity of the core composite. This procedure may be necessary if the impregnation of the "prepreg" material used for manufacturing the cover layers with a curable plastics material (thermosetting plastics), more particularly epoxy resin, polyester resin, phenol resin or a BMI resin might not be enough for a sufficiently load-bearing adhesive bonding of the cover layers to the folded honeycomb core.

According to a further development of the method according to the invention it is proposed that an upper side and/or a lower side of the folded honeycomb core is filled with the core filler material and moulded such that a polygon-free outer and inner contour of the future cover layers of the core composite mounted thereon is produced.

An edge-free upper side and/or lower side of the future core composite is hereby achieved which has optimum structural mechanical and aerodynamic as well as aesthetic properties. The core composite manufactured according to the invention can thus be used directly for manufacturing the fuselage sections or other primary structural parts of aircraft without the need for additional and in some circumstances weight-increasing secondary machining steps, such as smoothing, grinding etc.

The shaping of the core filler material introduced which is required to obtain smooth or continuous top and bottom sides of the core composite can be carried out by way of example by flat as well as single or spherically (double) curved—depending on the desired geometry of the core composite—contact pressure plates or tools. Furthermore it is possible to smooth and shape the already slightly dressed core filler material by a suitable drawing tool wherein this method can be applied with particular advantage when the folded honeycomb core is already placed on a rotating winding mandrel.

According to a further advantageous further development it is proposed that the tool is a rotating winding mandrel on which the prepreg material is wound in layers to form at least one cover layer.

It is hereby possible to make a complete fuselage section for a large aircraft in one piece with a core composite by using the drainage-enabling folded honeycomb core. In this case it is recommended as a rule to use several prefabricated folded honeycomb cores abutting against one another with a corresponding inherent curvature which are spliced at the seam points to produce a mechanical connection.

Alternatively the tool used for carrying out the method can also have a flat, a one-dimensionally or even two-dimensionally curved surface geometry (spherically curved or single axle curved). In this case a shell segment can be made by way of example for a fuselage section of an aircraft or a plate-like component part. The aircraft fuselage section is then assembled as in the case of the conventional aluminium construction in aircraft construction from several shell segments by forming longitudinal seams.

A further development of the method proposes that the core composite is given by means of the tool a shell segment shaped geometry for the manufacture of a fuselage section.

Through the laminar single or double (spherical) curved tool it is possible to manufacture by means of the method shell segments for the production of aircraft fuselage sections as core composite wherein the relevant fuselage sections are then made by joining several shell segments by forming longitudinal seams. With flat tools it is also possible to manufacture where necessary plate-like non-curved core composites with the method.

Further features and advantages of the invention are apparent from the following description of preferred embodiments in which reference is made to the accompanying drawing.

FIG. 1 shows diagrammatically in perspective view a core composite manufactured according to the method according to the invention with a folded honeycomb core.

FIGS. 2 to 5 each show diagrammatically an embodiment of the method sequence according to the invention.

FIG. 1 shows a core composite manufactured according to the terms of the method according to the invention with a sandwich structure which has a curvature in the direction of space. The two cover layers covering the folded honeycomb core on both sides are only shown in outline, but moreover transparent in order to give a view on the inner construction of the folded honeycomb core.

A core composite 1 has an upper cover layer 2 and a lower cover layer 3 between which a folded honeycomb core 4 is mounted. Both the cover layers 2, 3 and also the folded honeycomb core 4 are curved in one spatial direction. Basically with this method flat, single curved or double (spherical) curved core composites can be made having extremely high load bearing capacity. The folded honeycomb core 4 has a number of parallel mounted full length and trapezoidal running (drainage) channels 5, 6. The channels 5, 6 are defined by the base lines 7 to 9 as well as the apex lines 10 to 12, which also have a trapezoidal path. Basically the channels 5, 6 can also have a roughly rectangular, trapezoidal or corrugated (sinusoidal) path.

The course of the manufacturing process will be explained in further detail with reference to FIGS. 2 to 5 to which reference is made in the following description.

Figure 2:
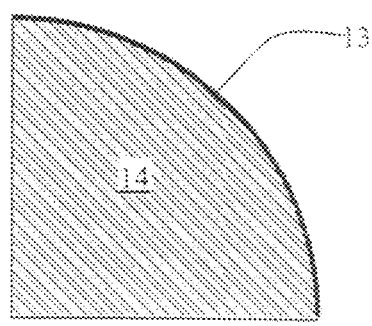
Figure 3:
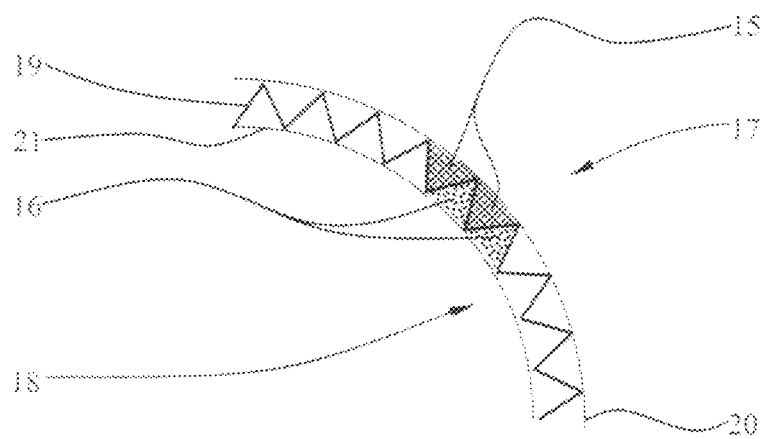

First, as shown in FIG. 2 in step a) a lower still "wet" cover layer 13 is applied to a tool 14. The lower cover layer 13 is formed with a reinforcement fibre arrangement of any kind pre-impregnated with a curable plastics material, for example a carbon fibre woven material impregnated with an epoxy resin or a carbon fibre non-crimp material ("prepreg" material). This "prepreg" material can be placed web-like on the tool 14 or in the event of a rotating, then substantially rotationally symmetrical tool 14 can also be wound on this. In the case of a sufficiently narrow band-like "prepreg" material this can also be laid in the TFP (tailored fibre placement) process. The surface geometry of the tool 14 defines at least the inner shaping of the future core composite.

In a further method step b) (see FIG. 3) a removable core filler material 15, 16 is introduced both into a top side 17 and underneath side 18 of a folded honeycomb core 19 wherein the folded honeycomb core 19 is already pre-shaped on the part of the manufacturer so that it corresponds to a predetermined ideal geometry of the future core composite component part. It should thereby be taken into consideration that an outer contour 20 and an inner contour 21 follows constantly curved (i.e. smooth) and polygon-free the desired ideal geometry of the future core composite which is to be manufactured. The core filler material 15, 16 can be removed again from the folded honeycomb core 19 by a solvent or where necessary by melting.

The introduction of the core filler material 15, 16 at least in some areas into one or both sides of the folded honeycomb core 19 can be carried out for example by a suitable tool by drawing along the core filler material 15, 16 which has not yet fully hardened. As core filler material 15, 16 can be used by way of example the water-soluble material "AquaCore®". The core filler material 15, 16 prevents the cover layers from being drawn (so-called "telegraphing") into the relatively large-volume full-length channels of the folded honeycomb core 19. Optimum properties are hereby reached in respect of the achievable static strength, the aerodynamic properties as well as the outer optical appearance of both sides of the subsequent core composite.

Figure 4:
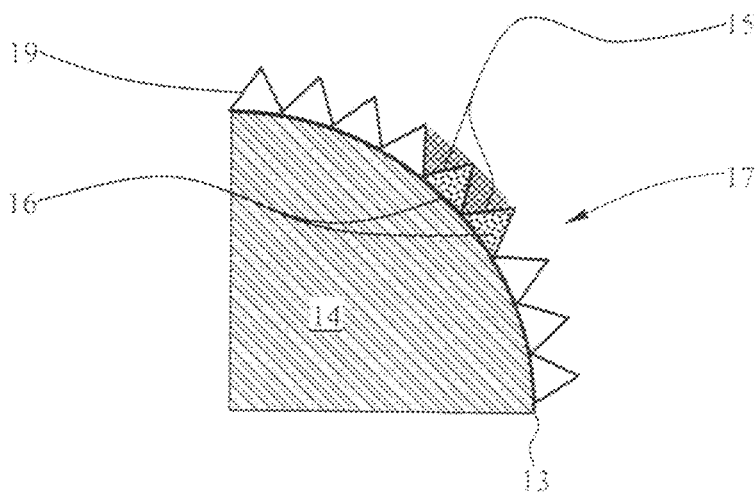

In step c), as illustrated in FIG. 4, at least one folded honeycomb core 19 which is prepared or prefabricated in step b) is placed on the lower cover layer 13 which is already placed on the tool 14.

Alternatively by restricting the introduction of the core filler material 15, 16 to the top side of the folded honeycomb core 19, the introduction at least in some areas as well as the contour shaping of the core filler material 15, 16 can only take place during the course of this method step.

Figure 5:
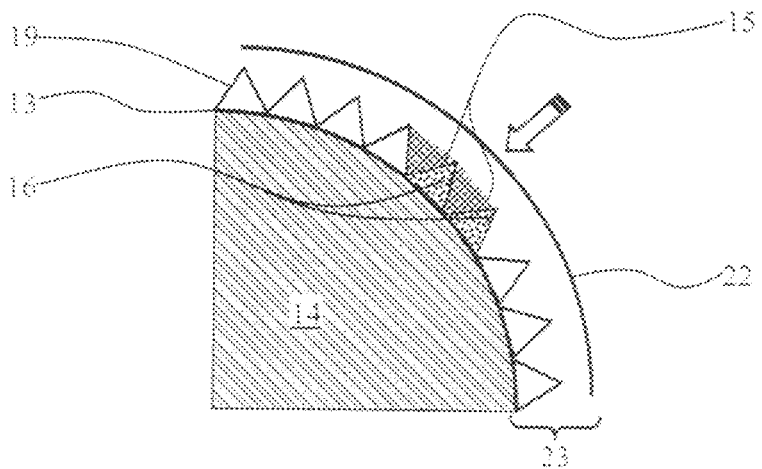

In step d) as shown in FIG. 5, a second upper cover layer 22 is arranged on the folded honeycomb core 19 to produce a complete core composite 23. The upper cover layer 22 is also made with a suitable wet "prepreg" material by placing or winding—provided a suitable tool 14 is available.

According to the requirements of method step e) the hardening of the core composite 23 is carried out by means of conventional methods, for example in an autoclave with simultaneous application of pressure and temperature wherein the construction can be covered with a vacuum foil.

Alternatively hardening can also take place under atmospheric pressure. In this case the tool 14 can be designed electrically heatable by way of example. In order to achieve a uniform and rapid hardening of the core composite 23 the upper cover layer 22 can be pressed onto the folded honeycomb core 19 with a preferably likewise electrically heatable tool which follows the desired external geometry of the core composite.

The concluding method step f) relates to the removable of the core filler material 15, 16 from the finished hardened core composite 23 which can take place by way of example by dissolving using a suitable solvent or by melting.

Deviating from the quarter-circle shaped cross-sectional geometry of the tool 14 this can be designed by way of example also as a winding mandrel with a roughly circular, elliptical, oval cross-sectional shape or any type of curved cross-sectional geometry for winding up or laying down the cover layers 13, 22 as well as at least a folded honeycomb core 19. Basically the tool 14 can also have a flat configuration for creating plate-type core composites.

The method according to the invention allows a precisely contoured, more particularly polygon-free manufacture of in particular single or double curved core composites. Basically complete aircraft fuselage sections can be formed in one piece with such core composites in which an additional reinforcement using stringers and/or ring formers can be omitted at least in some sections as a result of the high inherent strength of the core composite.

Alternatively at least two shell segments can also be made with core composites which are then connected to one another along longitudinal seams to make up one complete fuselage section.

REFERENCE NUMERALS

1 Core composite
2 Upper cover layer (core composite)
3 Lower cover layer (core composite)
4 Folded honeycomb core
5 Channel (drainage-enabling)
6 Channel (drainage-enabling)
7 Base line
8 Base line
9 Base line
10 Apex line
11 Apex line
12 Apex line
13 Lower cover layer (core composite)
14 Tool
15 Core filler material
16 Core filler material
17 Upper side (folded honeycomb core)

18 Lower side (folded honeycomb core)
19 Folded honeycomb core
20 Outer contour (folded honeycomb core)
21 Inner contour (folded honeycomb core)
22 Upper cover layer (core composite)
23 Core composite

The invention claimed is:

1. A method for manufacturing a core composite having a folded honeycomb core provided on both sides with cover layers wherein the folded honeycomb core has drainage-enabling channels running parallel to the cover layers, the method comprising:
    arranging a lower cover layer formed with a wet prepreg material on a tool, introducing a core filler material at least in some areas into the folded honeycomb core,
    arranging the at least one folded honeycomb core on the lower cover layer,
    arranging the prepreg material on the folded honeycomb core to provide an upper cover layer,
    hardening the entire core composite by applying pressure and/or temperature, and
    removing the core filler material, wherein the core filler material is removed from the folded honeycomb core by melting or dissolving with a solvent.

2. The method according to patent claim 1, wherein the lower and/or upper cover layer are stuck by an adhesive to the folded honeycomb core at least in some areas.

3. The method according to patent claim 1, wherein an upper side and/or a lower side of the folded honeycomb core is/are filled out and shaped with the core filler material so that a polygon-free outer and inner contour of the mounted cover layers are set.

4. The method according to claim 1, wherein the tool is a rotating winding mandrel on which the prepreg material is wound to form at least a cover layer.

5. The method according to claim 1, wherein the core composite is given a substantially shell-segment shaped geometry by the tool.

6. The method according to claim 4, wherein the core composite is given a substantially hollow cylindrical geometry by the winding mandrel.

7. The method according to claim 1, wherein as prepreg material is used a semi-finished product pre-impregnated with a curable plastics material with reinforcement fibres, wherein the pre-impregnated semi-finished product is only hardened after processing.

8. The method according to claim 1, wherein the at least one folded honeycomb core is formed with a laminar surface reinforcement arrangement which is impregnated with a curable plastics material and is initially flat and then repeatedly folded.

* * * * *